(12) United States Patent
Niki et al.

(10) Patent No.: US 6,227,994 B1
(45) Date of Patent: May 8, 2001

(54) PULLEY, BALL BEARING AND BELT TRANSMITTING DEVICE

(75) Inventors: Motoharu Niki; Yoshiaki Suzuki, both of Iwata; Tadahisa Suzuki, Tenryu; Masahiro Muranaka, Iwata, all of (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 09/071,916

(22) Filed: May 5, 1998

Related U.S. Application Data

(62) Division of application No. 08/699,654, filed on Aug. 19, 1996, now Pat. No. 6,010,420.

(51) Int. Cl.⁷ ...................................................... F16H 7/00
(52) U.S. Cl. ........................... 474/153; 474/148; 474/149
(58) Field of Search .................................. 474/124, 125, 474/148, 167–169, 172–175, 162, 139, 117, 136, 135, 131–133, 153, 149

(56) References Cited

U.S. PATENT DOCUMENTS

| | | |
|---|---|---|
| 1,279,574 | 9/1918 | Morris . |
| 1,356,444 | 10/1920 | Golden . |
| 1,847,177 * | 3/1932 | Freedlander ........................ 474/167 |
| 2,142,477 | 1/1939 | Murden . |
| 2,214,541 * | 9/1940 | Siegling ............................ 474/167 X |
| 2,316,449 | 4/1943 | Parker . |
| 3,169,262 * | 2/1965 | Allen et al. ....................... 474/150 X |
| 3,844,632 | 10/1974 | Ryczek . |
| 4,048,702 | 9/1977 | Garnett . |
| 4,084,397 | 4/1978 | McGrath . |
| 4,500,303 * | 2/1985 | Sermersheim et al. .......... 474/117 X |
| 4,553,951 * | 11/1985 | Pavone ............................. 474/167 X |
| 4,680,982 | 7/1987 | Wilke et al. . |
| 4,718,781 | 1/1988 | Gérard . |
| 4,916,751 | 4/1990 | Sumita et al. . |
| 4,934,987 * | 6/1990 | Kadota et al. ................... 474/135 X |
| 5,207,515 | 5/1993 | Weissgerber et al. . |
| 5,484,212 | 1/1996 | Guaraldi et al. . |
| 5,924,947 * | 7/1999 | Williams .......................... 474/148 X |

FOREIGN PATENT DOCUMENTS

| | | |
|---|---|---|
| 792289 | 12/1935 | (FR) . |
| 846452 | 9/1939 | (FR) . |
| 9184566 * | 7/1997 | (JP) . |

\* cited by examiner

*Primary Examiner*—David A. Bucci
*Assistant Examiner*—Marcus Charles
(74) *Attorney, Agent, or Firm*—Arent Fox Kintner Plotkin & Kahn, PLLC

(57) ABSTRACT

Means are provided for effectively restricting or preventing occurrence of abnormal noise under cold ambient. The means are durable, cost effective and also keep the function of a pulley.

A ball bearing 2 of a single row type includes an outer ring 2a and balls 2c. The outer ring 2a and each ball 2c are contacted with each other at two points. An oil groove 5 is formed at a position adjacent to the contact positions P and Q on the raceway surface between the raceway surface 3a of the outer ring and the balls 2c. The ball bearing 2 is fitted within or made integral with the inner diameter of a pulley body 1 having a peripheral surface 1e to be contacted with a belt.

6 Claims, 9 Drawing Sheets

FIG.3

| TEST CONDITION | CONTENTS | |
|---|---|---|
| TEST BEARING | 6203 BASIS | |
| RADIAL CLEARANCE AFTER INSTALLATION | 0 ~ 10 μm | |
| NUMBER OF TEST PIECES | 10 PIECES x 10 TIMES | |
| ROTATIONAL SPEED | 2500 r/min | |
| RADIAL LOAD | 98 N [10kgf] | |
| BEARING TEMPERATURE | -20°C | |
| GREASE | ※ E | |
| RESULTS — HOOT NOISE OCCURRED | 0/100 | 0% |
| RESULTS — SOUNDS OTHER THAN HOOT NOISE OCCURRED | 0/100 | 0% |

※ "E" INDICATES A GREASE WHICH CAUSED ABNORMAL NOISE UNDER COLD AMBIENT MOST FREQUENTLY IN THE PAST.

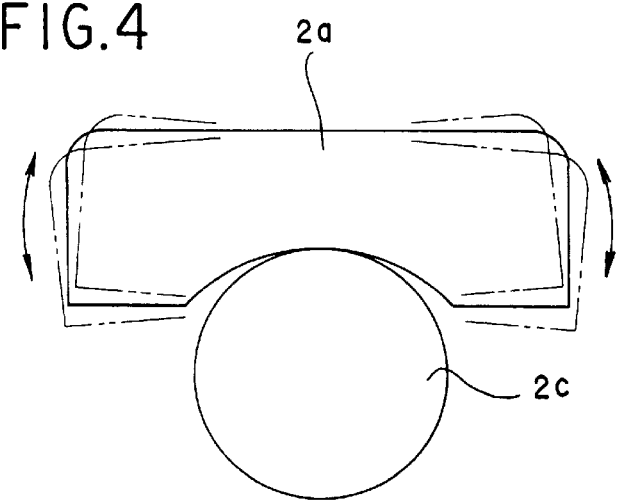

FIG.4

PULLEY, BALL BEARING AND BELT TRANSMITTING DEVICE

CROSS REFERENCE TO RELATED APPLICATION

This application is a divisional of U.S. patent application Ser. No. 08/699,654, filed Aug. 19, 1996 now U.S. Pat. No. 6,010,420. The subject matter of that application is hereby incorporated by reference.

BACKGROUND OF THE INVENTION

This invention generally relates to a pulley and a ball bearing for a pulley. In particular, the invention relates to a ball bearing for use in a timing belt of an engine of an automobile, and a pulley to be contacted with a belt for driving accessory of an automobile.

In a timing belt for an engine of an automobile, or an accessory driving belt, a pulley is arranged so as to increase an angle of contact of a belt for the purpose of applying an appropriate tension to the belt. FIG. 12 shows a constructional example of a timing belt. This timing belt includes a belt E which is stretched around a driving pulley A secured to a crankshaft, a driven pulley B, B secured to a camshaft, a tensioner pulley C rotatably mounted on a stationary shaft, and an idler pulley D mounted on a stationary shaft. Among the above-mentioned pulleys, the pulleys C and D mounted on the respective stationary shafts are usually constituted by a ball bearing supported pulley. The ball bearing is fitted within the inner diameter of the pulley. It is noted that the stationary shaft for the tensioner pulley C is displaceably supported in elongated openings provided in a frame for supporting the tensioner pulley. By this, tension adjustment of the belt is permitted.

Such a kind of pulley may include a pulley in which a peripheral surface of the pulley to be engaged by a belt is provided directly around the outer diameter of an outer ring of a ball bearing (called a hat type outer ring). It is noted, however, that a pulley of the type shown in FIG. 13 is frequently used. This pulley includes a pulley body 11 having a peripheral surface 11c and a ball bearing 12 which are engaged with each other as a unit.

The pulley body 11 is pressed from a steel plate. The pulley body 11 includes an outer cylindrical portion 11a around which a belt is extended, and an inner cylindrical portion 11b fitted over an outer ring 12a of the ball bearing 12. A peripheral surface 11c of the pulley is provided around the outer diameter of the outer cylindrical portion 11a. The ball bearing 12 includes the outer ring 12a fitted within the inner cylindrical portion 11b of the pulley body 11, an inner ring 12b fitted over a stationary shaft (not shown), a retainer 12d for retaining a plurality of balls 12c provided in a space between the raceway surfaces of the inner and outer rings 12b and 12a, and a seal 12e for sealing a grease.

In the above-mentioned pulley, and when the pulley body 11 is rotated by a rotational driving force from the belt, the outer ring 12a of the ball bearing 12a fitted within the pulley body is rotated integrally with the pulley body 11.

In the above-mentioned pulley, the ball bearing 12 is of a outer ring rotation type, and usually, a deep groove ball bearing is used provided with zero contact angle.

When the above-mentioned pulley is driven under cold ambient, abnormal noise (hoot sound) may be caused, depending upon a given specification of the pulley and/or operational condition. Such abnormal sound under cold condition, i. e., abnormal noise under cold ambient is not always caused during use. Occurrence of such abnormal noise under cold ambient greatly depends upon a given ambient temperature. Thus, it occurs only in a very limited area (for example, Hokkaido Prefecture in Japan). Such abnormal noise under cold ambient occurs in a brief time (within one minute at the longest) after an engine start of an automobile. Thereafter, no abnormal noise is caused. Abnormal noise is frequently caused when a deep groove ball bearing of a single row type is used as a ball bearing. Occurrence of abnormal noise is reduced when an angular ball bearing of a plural row type is used.

Abnormal noise under cold ambient has a complexed nature as mentioned above, so that it is difficult to reproduce such abnormal noise under cold ambient. Accordingly, the cause or mechanism for the occurrence of abnormal noise has not been definitely clarified. As far as a pulley for use with an automobile is concerned, it is operated at a high temperature and at a high speed. Thus, durability is one of the important factors for such pulleys. Accordingly, any counter-measures leading to a reduction in durability could not be employed.

For the reasons given above, no particular means for elimination of such abnormal noise under cold ambient has been proposed heretofore.

Conventionally, a grease having a superior property at lower temperature (being able to form uniform oil film in the contact portions between the rolling element and the raceway surfaces of the inner and outer rings) has been proposed in order to eliminate abnormal noise under cold ambient. This counter-measure is intended to restrict occurrence of abnormal noise under cold ambient by increasing lubrication ability of a grease under cold ambient, and expected to give a relatively high effect. It is noted, however, that such a grease has an lower viscosity, so as to provide an insufficient lubrication ability at high temperature. This may lead to a reduced durability.

Accordingly, it is the main object of the invention to provide means, keeping the function of a pulley, for effectively restricting or preventing occurrence of abnormal noise under cold ambient, while, at the same time, satisfying durability and cost effectiveness.

SUMMARY OF THE INVENTION

Generally speaking, oil film on a raceway surface tends to become uneven and irregular during cold ambient, due to the increase in viscosity of base oil of a grease. When such unevenness and irregularity of the oil film occur, the friction coefficient between a rolling element and the raceway surface is caused to be periodically changed within a small range, so as to cause self-excited vibration of the rolling element.

The applicant has discovered several mechanisms to be occurred during a test for reproducing abnormal noise under cold ambient.

1. When abnormal noise occurred under cold ambient, a pulley (outer ring) was being oscillated in the axial direction. The frequency component at that time corresponded to the acoustic frequency of the abnormal noise (hoot sound) under cold ambient.

2. When no abnormal noise occurred under cold ambient, the above frequency component could not be found.

3. The frequency component when abnormal noise occurred under cold ambient, the same phase is recognized at two measuring points 180 degrees on the end face of the pulley.

Although a mechanism in which abnormal noise under cold ambient occurs has not been completely analyzed, it is considered from the above results that the abnormal noise under cold ambient is caused mainly by the fact that resonance of vibration of the pulley system is caused by self-excited vibration of the rolling element, so that the outer ring is caused to be oscillated in the axial direction (translational movement)

The present invention is aimed, based on the above assumption, at provision of a construction or arrangement for effectively restricting axial vibration of the outer ring due to the self-excited vibration of the rolling element, in order to eliminate abnormal noise under cold ambient.

Accordingly, the present invention provides a pulley including a pulley body having a peripheral surface which is contacted with a belt to be driven by an engine of an automobile. The pulley body is fitted on the outer diameter of an outer ring of a ball bearing. The ball bearing is arranged in a single row, so as to give a contact angle. By this, behavior of the rolling element, in particular, the behavior in the axial direction may be restricted, so that the self-excited vibration of the rolling element is effectively restricted. By this, frequency components in the axial direction of the pulley may be restricted. The term "single row" is meant to express a ball bearing having a single row of rolling element. The term "contact angle" is meant to indicate an angle to be defined by a line along which a load is applied to the rolling element and a plane perpendicular to the central axis of the ball bearing. When the contact angle is increased, the effect to restrict the self-excited vibration of the rolling element is increased, so as to restrict occurrence of abnormal noise under cold ambient. It is noted, however, that, when the contact angle is excessively increased, disadvantages such as decrease in service life of the bearing may occur. Accordingly, the contact angle should be selected at an appropriate value, considering the above advantages and disadvantages.

It is desirable that each ball of the ball bearing and, among the inner and outer rings, at least the outer ring are contacted at two points. The inner ring and each ball may be contacted at one point or at two points.

It is not likely that a uniform load is applied to the two contact points, even when the outer ring and the rolling element are contacted at two points. Usually, a load is concentrated to only one contact point by reason of vibration of the belt so that sliding friction is frequently caused at the other contact point. Usually, such sliding friction would disappear in brief of time. It is noted, however, that the sliding friction would continue for an extended period of time, depending upon the ambient in which the bearing is used. There would be a risk in which one contact point is heated to a high temperature due to friction heat, so as to degrade the bearing ability.

In order to eliminate the above problem, an oil groove is provided at a position adjacent to each contact position between the raceway surface of the outer ring and the rolling element, in accordance with the invention. During running of the bearing, the grease contained within the oil grooves is continuously supplied to the two contact points, so that they may be lubricated by the grease. Thus, either one of the contact points may be prevented to be heated to an extremely high temperature, even when it lacks oil film. Certain quantity of grease may be maintained within the oil groove even after the shut down of the operation. Thus, uniform oil film may be quickly formed in the raceway surface of the outer ring at the time of restarting of the operation. In this respect, it is also possible to restrict occurrence of abnormal noise under cold ambient which is caused mainly by unevenness of oil film upon restarting of the operation. After shut down of the operation, grease is flown into the lower portion of the bearing, i. e., the bottom of the oil groove.

The present invention also provides a ball bearing for a pulley. The ball bearing includes an outer ring having an outer diameter. The outer diameter of the bearing is fitted within a pulley body of the pulley. The pulley body includes a peripheral surface which is engaged by a belt to be driven by an engine of an automobile. The ball bearing is arranged in a single row so as to give a contact angle.

The invention also provides a ball bearing having an outer ring. The outer diameter of the outer ring is fitted within a pulley body having a peripheral surface which is engaged by a belt to be driven by an engine of an automobile. The ball bearing is arranged in a singly row. A rolling element of the bearing and, among the inner and outer rings, at least the outer ring are contacted with each other at two points. An oil groove is provided at a position adjacent to each contact position between the raceway surface of the outer ring and the rolling element.

When the raceway groove of the outer ring of the ball bearing is configured to be Gothic arch, elliptic, parabolic or hyperbolic, each ball and the outer ring may be contacted at two points. When the raceway groove of the inner ring is similarly configured, each ball and the inner ring may be contacted at two points. It is also noted that the pulley body and the outer ring may be integrally formed.

The above-mentioned constructions may all be similarly applied to a fan for forcibly cooling cooling water of an engine. Sometimes, such a fan is rotatably mounted on a shaft through a ball bearing, the shaft being driven by the engine. In such a case, abnormal noise under cold ambient may be caused mainly due to the self-excited vibration of the rolling element.

In accordance with the invention, a belt is extended between a drive pulley and a driven pulley. The belt includes a drive surface and a backside surface. The drive surface of the belt is engaged with the driving pulley and the driven pulley. An idler pulley is disposed between the driving pulley and the driven pulley. The idler pulley includes a pulley body having a peripheral surface which is engaged by the belt. The pulley body is fitted over the outer diameter of the outer ring of a ball bearing. The pulley body and the outer ring may be integrally formed. The idler pulley is engaged with the backside surface of the belt. The idler pulley and the backside surface of the belt are contacted through two or more recess/protrusion engagement portions spaced along the width of the belt.

By this, anti-vibration effect of the belt is exerted, so as to restrict behavior, in particular, the axial behavior, of the outer ring, so that vibration of the outer ring in the axial direction is effectively restricted, whereby high frequency component in the axial direction of the pulley may be restricted. The term "idler pulley" is meant to indicate a pulley rotatably supported by a stationary shaft. Thus, not only the idler pulley D, but also the tensioner pulley C shown in FIG. 12 is included in the category of "idler pulley".

A belt according to the invention may be utilized in a belt transmitting device including an idler pulley disposed between a driving pulley and a driven pulley, the idler pulley including a pulley body having a peripheral surface. The pulley body is fitted on the outer diameter of a outer ring of a ball bearing. The belt includes a drive surface and a backside surface. The drive surface is engaged with the drive pulley and the driven pulley. The back side surface is engaged with the drive pulley and extended between the drive pulley and the driven pulley. The backside surface of the belt is provided with plural rows of engagement portions, the engagement portion being formed by a recessed groove or a protrusion.

The idler pulley according to the invention may be used in a belt transmitting device. The belt transmitting device includes a belt extended between a drive pulley and a driven pulley. The belt includes a drive surface and a backside surface. The drive surface is engaged with the drive pulley and the driven pulley. The idler pulley includes a pulley body having a peripheral surface which is engaged with the belt. The pulley body is fitted on (or integrally formed with) the outer diameter of an outer ring of a ball bearing. The idler pulley is engaged with the backside surface of the belt and disposed between the drive pulley and the driven pulley. The peripheral surface of the pulley is provided with plural rows of annular engaged portions which is formed by a recessed groove or a protrusion.

Due to the above construction, the present invention provides particular advantages mentioned below.

1. By giving a contact angle to the ball bearing, or by contacting together the outer ring and the rolling element of the ball bearing at two points, the behavior, in particular, the behavior in the axial direction of the rolling element may be restricted. By this, self-excited vibration, which is considered to be one of the causes for the occurrence of abnormal noise under cold ambient, may be effectively restricted. Angular deflection of the pulley may be reduced. Thus, vibration of the belt is restricted, so as to increase durability and ability of the belt and the ball bearing.

2. A grease reservoir may be formed, depending upon the configuration of the raceway surface. The grease reservoir advantageously contributes to the formation of oil film.

3. When an oil groove is formed at a position adjacent to each contact position between the raceway surface of the outer ring and the rolling element, a grease reservoir may be provided. When sliding friction is caused at one of the contact points, lack of oil film at that contact point may be restricted, so as to maintain an increased lubrication condition. Uniform oil film may be quickly formed in the raceway surface of the outer ring by means of the grease contained within the oil groove, upon restart of the operation. This, together with the above means (the outer ring and the rolling element are contacted at two points), reliably prevents occurrence of abnormal noise under cold ambient.

4. In the belt transmitting device, the idler pulley and the backside surface of the belt are engaged through two or more recess/protrusion engagement portions spaced along the width of the belt. By this, anti-vibration effect of the belt is exerted, so as to restrict the behavior, in particular, the axial behavior of the outer ring. Thus, it is possible prevent occurrence of abnormal noise under cold ambient.

5. The above advantages may be brought about, regardless of the type of seal grease. Unlike prior art pulley utilizing a grease having superior property at low temperature, decrease in durability at high temperature will not be expected. The invention does not require complexed construction of the bearing. The invention also permits mass-production of the products in cost-effective manner.

The above-mentioned advantages 1 to 3 and 5 may be similarly obtained when the invention is applied to a cooling fan for forcibly cooling water for an engine.

BRIEF DESCRIPTION OF THE DRAWINGS

FIG. 3 shows test conditions and the results of a performance test on a pulley incorporating a four-point contact ball bearing according to the invention;

FIG. 4 is a cross-sectional view showing angular deflection when an outer ring and a ball are contacted at one point;

DESCRIPTION OF PREFERRED EMBODIMENTS

A pulley and a ball bearing for a pulley according to the invention will be explained with reference to FIGS. 1 to 9.

Figure 1:
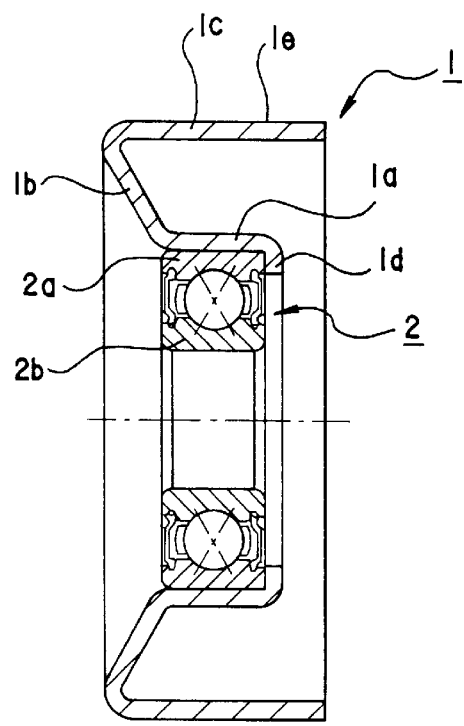
FIG. 1 is a cross-sectional view showing a pulley according to the invention.

The pulley shown in FIG. 1 is an idler pulley to be used in a timing belt for an automobile. The pulley includes a pulley body 1 pressed from a steel plate, and a ball bearing 2 of a single row type fitted within the inner diameter of the pulley body 1. The pulley 1 is constructed by an annular body including an inner cylindrical portion 1a, a flange portion 1b extending radially outwardly from one end of the inner cylindrical portion 1a, an outer cylindrical portion 1c extending axially from the flange portion 1b, and a collar portion 1d extending radially inwardly from the other end of the inner cylindrical portion 1a. An outer ring 2a of the ball bearing 2 is fitted within the inner diameter of the inner cylindrical portion 1a. The outer cylindrical portion 1c has its outer diameter a peripheral surface 1e with which a belt (not shown) is engaged or contacted. The pulley serves as an idler since the peripheral surface 1e is contacted with the belt.

Figure 2:
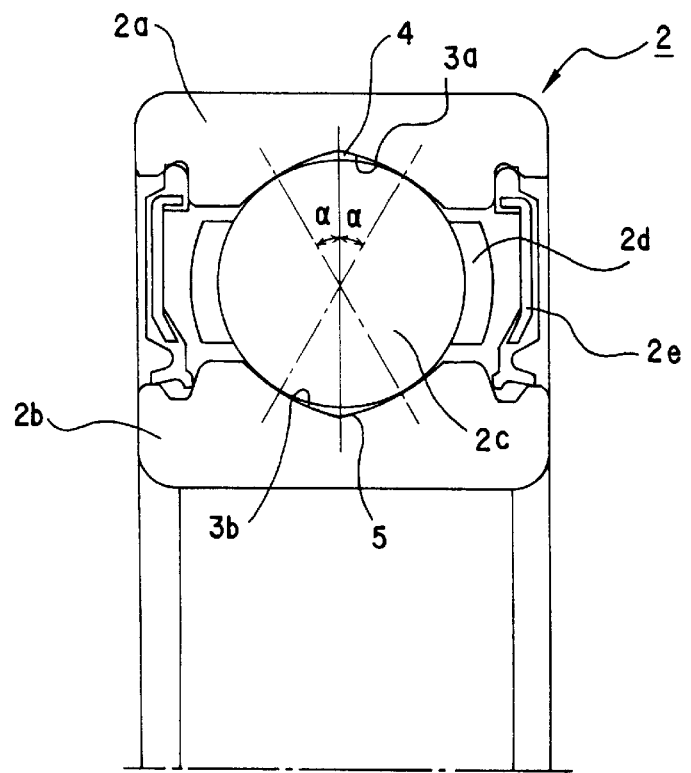
FIG. 2 is a cross-sectional view showing a ball bearing fitted in the pulley.
Figure 5:
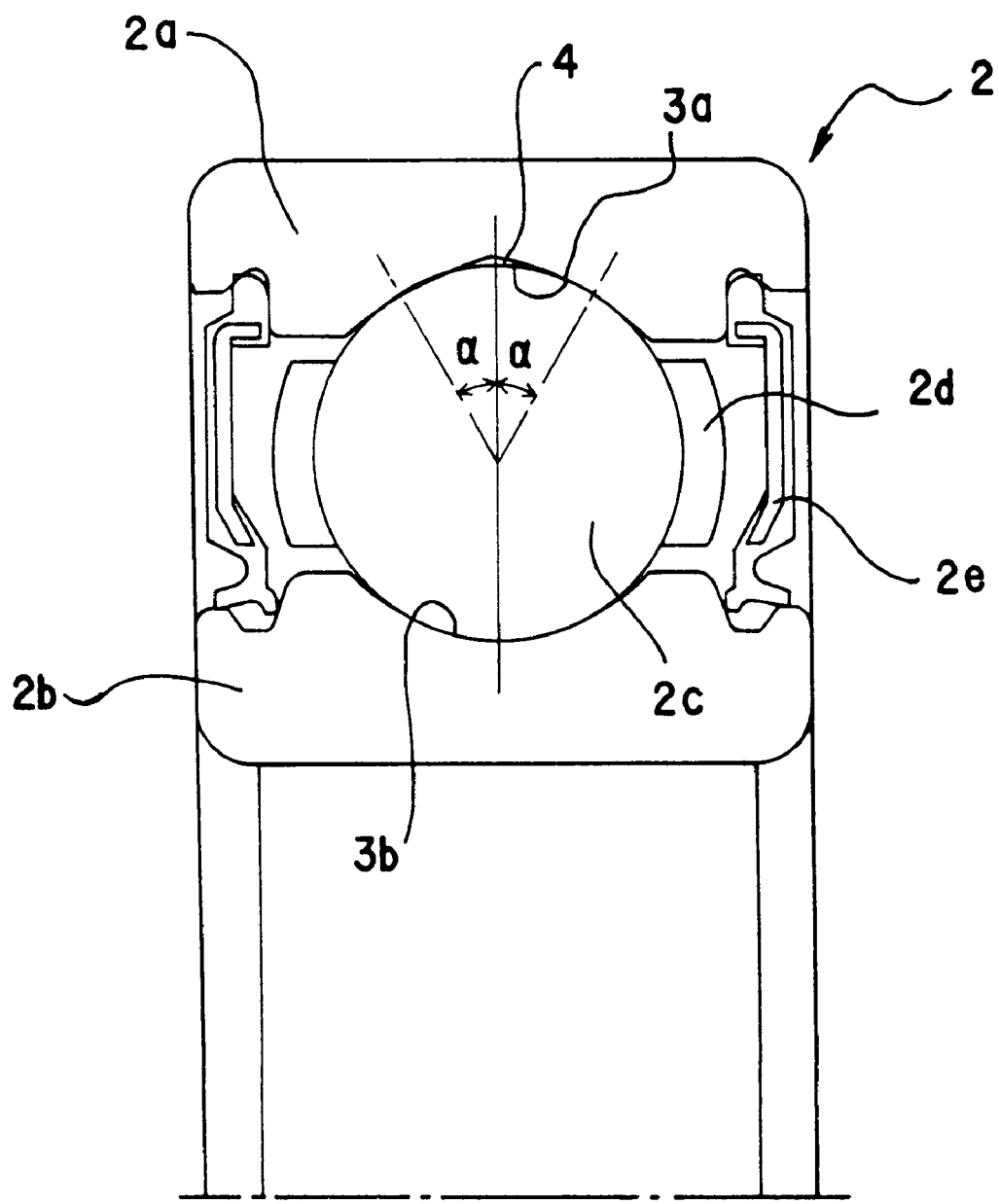
FIG. 5 is a cross-sectional view showing a three-point contact ball bearing.

FIG. 2 is a cross-sectional view showing the ball bearing 2 fitted in the pulley. The ball bearing 2 is a four-point contact ball bearing. The ball bearing includes an outer ring 2a fitted within the inner diameter of the inner cylindrical portion 1a of the pulley body 1, an inner ring 2b fitted in a stationary shaft (not shown), a plurality of balls (rolling elements) 2c provided between the raceway surfaces 3b, 3a of the inner and outer rings 2b, 2a, a retainer 2d for retaining balls 2c equidistally in the circumferential direction, and a pair of seals 2e for sealing a quantity of grease. The outer ring 2a and the inner ring 2b are separately formed in an integral form. The raceway surface 3a of the outer ring 2a and the raceway surface 3b of the inner ring 2b of the ball bearing form a so-called Gothic arch groove having two centers of curvature. Thus, the raceway surfaces form a predetermined contact angle "α" when they are in contact with the balls. That is to say, the ball 2c and the outer ring 2a, and the ball 2c and the inner ring 2b, respectively are in contact with each other at two points between which the deepest portion of the raceway surface 3a or 3b is positioned. The raceway surfaces 3a, 3b may take another configuration, other than the Gothic arch groove, which has a curvature in the contact area greater than that of the ball 2c, such as an elliptic, parabolic or hyperbolic groove.

FIG. 3 shows test condition and the test results of a test performed on a pulley incorporating the four-point contact ball bearing according to the invention, which test having been conducted under the condition which the applicant has once found to reproduce abnormal noise at cold condition.

Since the contact angle "α" (alpha) is applied to the ball bearing 2, the behavior of the ball 2c, in particular the behavior in the axial direction, is restricted, so that occurrence of self-excited vibration may be effectively restricted. Since the Gothic arch is provided, grease reservoirs 4, 5 are formed at the bottom of each of the raceway surfaces 3a, 3b. This advantageously contributes to the formation of grease film, in particular under cold circumstance.

In a conventional deep groove ball bearing, it is considered that, strictly speaking, the ball 2c and the outer ring 2a are contacted with each other at one point, as shown in FIG. 4. Thus, when a belt is driven by the pulley, the outer ring 2a is frequently caused to be oscillated about the contact point between the outer ring 2a and the ball 2c as a center of oscillation, as shown in FIG. 4 by two-dotted line. This phenomenon is generally referred to as an "angular deflection". On the contrary, and in accordance with the present invention, the ball 2c and the outer ring 2a are contacted with each other at two points, as mentioned above. Thus, it is possible to reduce the angular deflection of the outer ring 2a, so that vibration of the belt may be restricted. It is also possible to prevent leakage of the grease within the bearing, whereby durability of the belt and the bearing may be increased.

Although the four-point contact ball bearing has been explained in the above, the ball bearing is not restricted to such a four-point contact ball bearing. Specifically, it is possible to restrict the behavior of the balls to a substantial degree, provided that a contact angle "α" is defined at least between the outer ring 2a and the ball 2c, and that the outer ring 2a and the ball 2c are contacted with each other at two points, so that occurrence of abnormal sound under cold ambient is restricted. Accordingly, a three-point contact ball bearing shown in FIG. 5 may be used, wherein the inner ring 2b and the ball 2c are contacted at one point. It is also noted that the same advantages may be obtained by integrally forming the pulley body 1 and the outer ring 2a of the ball bearing 2, so as to give a contact angle "α" to the ball bearing portion.

Figure 6:
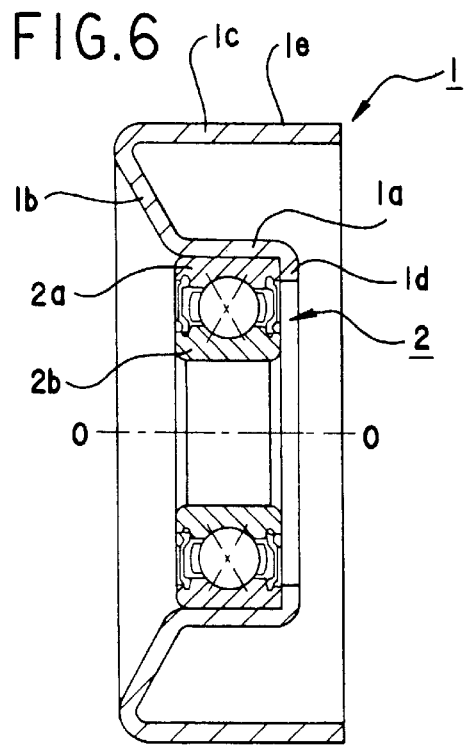
FIG. 6 is a cross-sectional view showing a pulley according to the invention.

A pulley shown in FIG. 6 is an idler pulley for use with an accessory drive belt of an automobile. This pulley is the same in construction as the pulley shown in FIG. 1, with the exception of the construction of the ball bearing 2.

Figure 7:
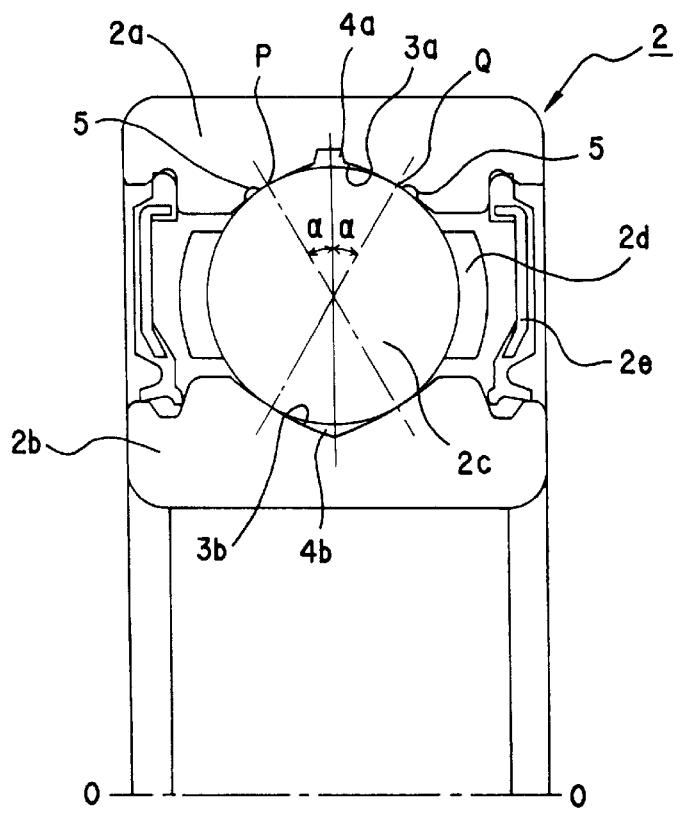
FIG. 7 is a cross-sectional view showing a ball bearing fitted in the pulley shown in FIG. 6.

FIG. 7 is a cross-sectional view showing a ball bearing 2 fitted in the pulley shown in FIG. 6. The ball bearing 2 is a four-point contact ball bearing which is the same as that shown in FIG. 2. The raceway surface of the outer ring 2a and the raceway surface 3b of the inner ring 2b define a so-called Gothic arch groove having two centers of curvature. Thus, the raceway surfaces form a predetermined contact angle "α" when they are in contact with the balls. That is to say, the ball 2c and the outer ring 2a, and the ball 2c and the inner ring 2b, respectively are in contact with each other at two points between which the deepest portion of the raceway surface 3a or 3b is positioned (the contact points between the ball 2c and the raceway surface 3a of the outer ring are indicated by P and Q in the drawing.).

Annular grease reservoirs 4a, 4b are respectively formed in the deepest portions of the raceway surfaces 3a, 3b respectively. The grease reservoirs facilitate formation of oil film, particularly under cold ambient. The configuration of each of the grease reservoirs 4a, 4b may be desirably determined. For example, the Gothic arch groove may be used, as in the case of the reservoir 4b in the inner ring. Alternatively, a recessed groove may be used, as in the case of the reservoir 4a in the outer ring.

In this case, the raceway surfaces 3a, 3b may also take another configuration, other than the Gothic arch groove, which has a curvature in the contact area greater than that of the ball 2c, such as an elliptic, parabolic or hyperbolic groove.

Oil grooves 5, 5 in the form of annulus having its center at the shaft center O—O are formed in the raceway surface 3a of the outer ring adjacent to the contact points P, Q between the outer ring 2a and the ball 2c. The grease reservoir 4a is positioned between the oil grooves 5, 5. The oil grooves 5, 5 are disposed slightly radially inwardly of the respective contact points P, Q, so that the grease may be surely supplied to the contact points P, Q due to the centrifugal force during rotation of the pulley. The locations of the oil grooves 5, 5 from the shaft center O—O are the same, so as to cause the same amount of grease to be flown into the respective contact points.

When the outer ring 2a and the ball 2c of the ball bearing 2 are contacted at two points, as mentioned above, the behavior of the balls 2c, in particular, the behavior in the axial direction of the balls 2c is restricted, so that occurrence of abnormal noise under cold ambient due to self-excited vibration of balls 2c may be effectively restricted.

When a load is concentrated to one of the contact points due to the vibration of the belt, while the other contact point is caused to generate heat due to the sliding friction, a quantity of grease is supplied to the other contact point from the oil groove 5 at a radially inward position by reason of a centrifugal force, for the purpose of lubrication. By this, lacking of oil film at the contact point may be prevented, so as to maintain an increased lubrication condition. It is also noted that certain quantity of grease is kept in the oil grooves 5 even after the shutdown of the operation. By this, a uniform oil film may be quickly formed in the raceway surface 3a of the outer ring at the time of restarting. From this point of view, it is also possible to restrict occurrence of abnormal noise under cold ambient.

Figure 8:
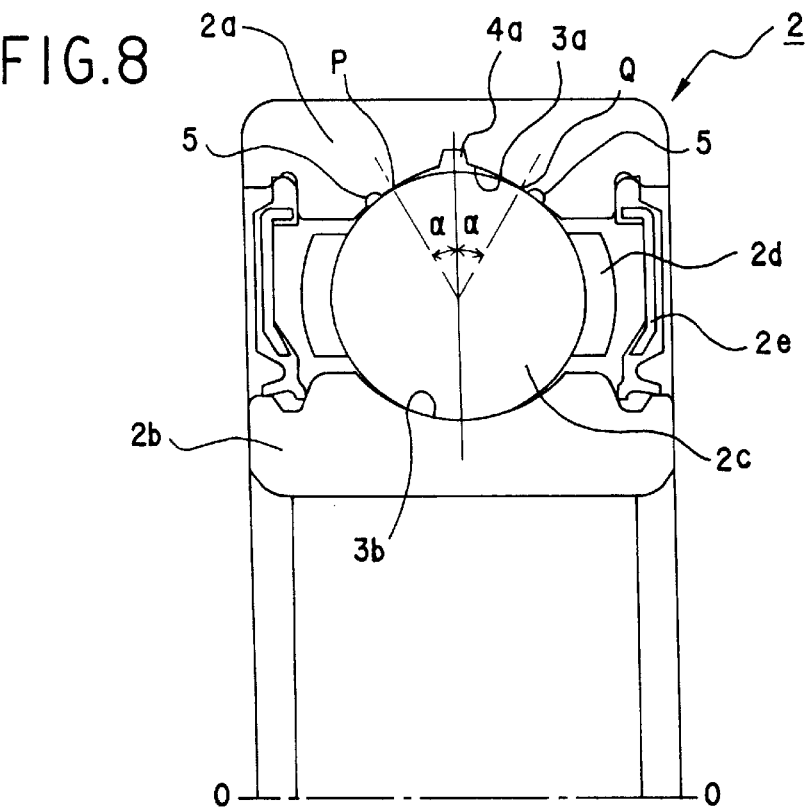
FIG. 8 is a cross-sectional view showing a three-point contact ball bearing.
Figure 9:
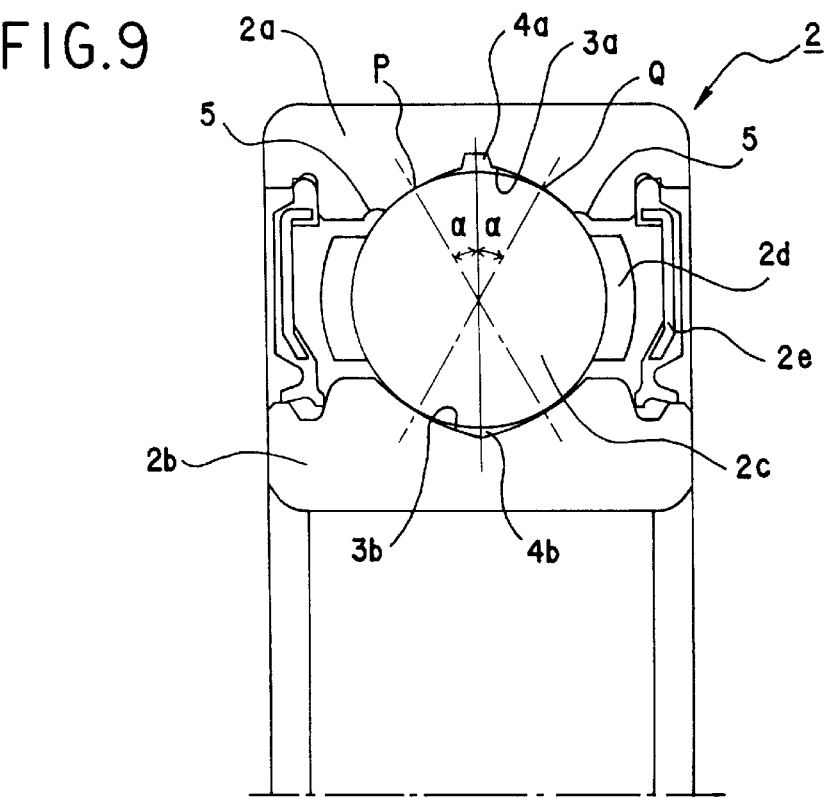
FIG. 9 is a cross-sectional view showing a ball bearing having an oil groove in the boundary between a raceway surface and the inner diametrical surface of the outer ring.

Another ball bearings, other than the four-point contact bearing ball 2, may be used, at least provided that the outer ring 2a and the ball 2c are contacted at two points. For example, a three-point contact bearing ball may be used wherein the inner ring 2b and the ball 2c are contacted at one point, as shown in FIG. 8. The oil grooves 5, 5 may be provided at any position adjacent to the contact points P, Q. The oil grooves may be provided at the boundary between the raceway surface 3a of the outer ring 2a and the inner diametrical surface. Similar advantages may be obtained when the pulley body 1 and the outer ring 2a of the ball bearing 2 are integrally formed.

Figure 14:
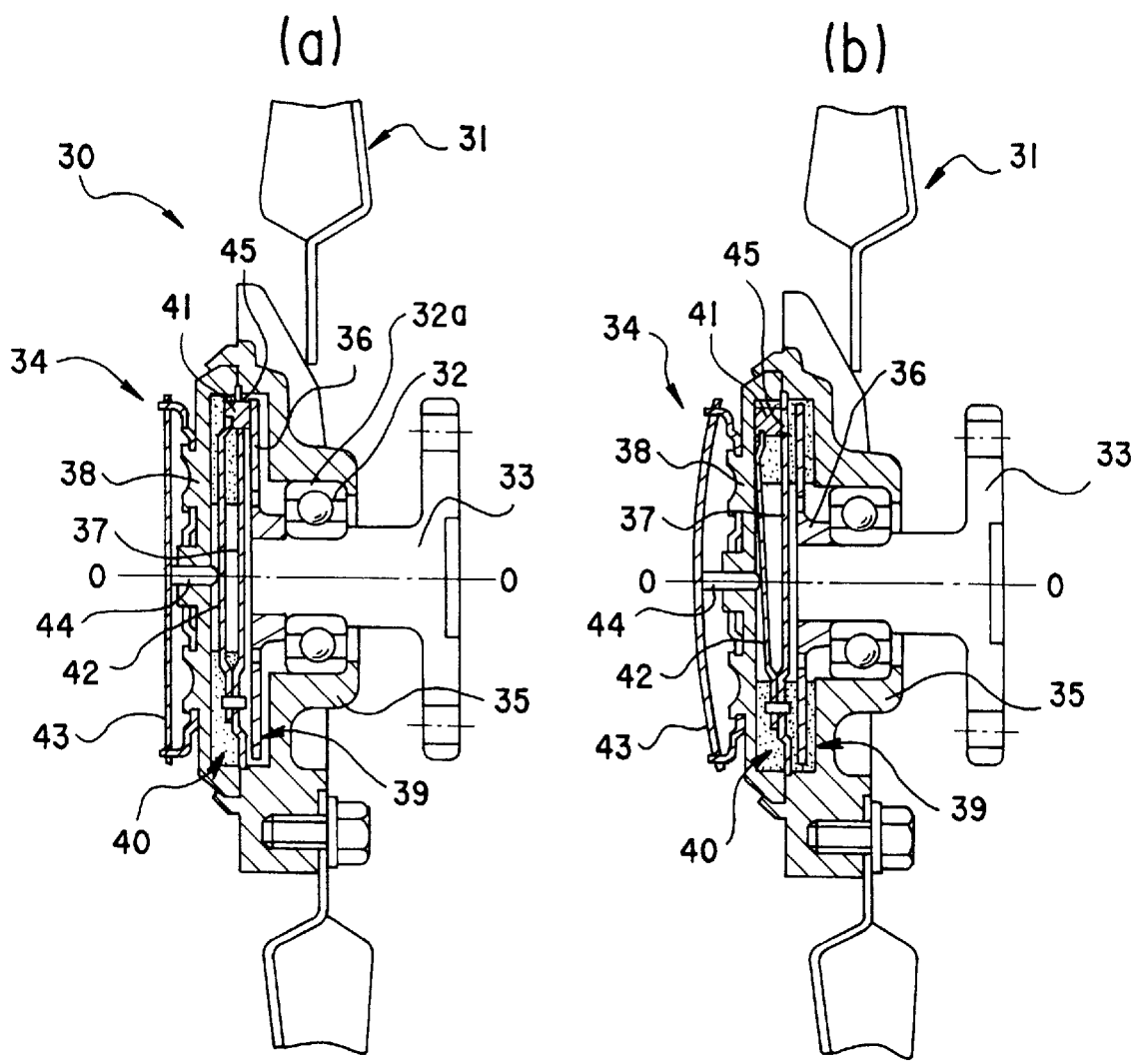
FIG. 14 is a cross-sectional view showing one constructional example of a cooling fan.

It is noted that the above-mentioned abnormal noise under cold ambient may be caused not only in the case of the pulley, but also in the case of a cooling fan for forcibly cooling a quantity of cooling water of a radiator. As shown in FIGS. 14 (a) and (b), the fan 30 includes an annular casing (rotatable member) 35, and a plurality of blades 31 attached to the periphery of the casing 35 and extending in the radial direction. The casing 35 is fitted over an outer ring 32a of a ball bearing 32. The fan 30 is rotatably mounted on a main shaft 33 which is rotated by an engine (the main shaft is bolted to a flange portion for example of a pump shaft). A temperature-responsive clutch mechanism 34 is disposed between the main shaft 33 and the fan 30. The temperature-responsive clutch mechanism is adapted to be engaged and disengaged in accordance with a temperature change of the outside air. Thus, a torque may be transmitted from the main shaft 33 through the clutch mechanism 34 to the fan 30. An exemplary construction for the clutch mechanism 34 will be explained below.

A drive disk 36 is fixedly fitted over the main shaft 33 at its forward end. The drive disk 36 is rotated in unison with the main shaft 33. A disk-shaped plate 37 is disposed at the forward end side of the drive disk 36. The plate 37 and the casing 35 cooperate to form a first chamber 39 serving as a torque transmission chamber therebetween. The plate 37 and a cover 38 cooperate to form a second chamber 40 serving as a reservoir for oil (viscid [viscous] fluid for torque transmission, such as silicone oil or the like). A plate spring 42 is disposed in the second chamber 40. The plate spring 42 has one end attached to a valve 41 and the other end secured to the plate 37. A bimetal 43 is secured to the cover 38. A piston 44 is mounted on the bimetal 43. The piston 44 is arranged coincidently with the axis (O—O) of the main shaft 33.

Figure 15:
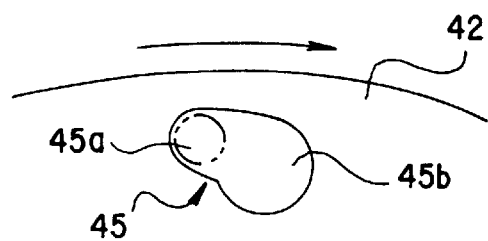
FIG. 15 is an enlarged front elevational view showing a hole provided in a plate of a clutch mechanism.

In the above construction, the bimetal 43 would not be bent hardly, when the outside air temperature is low, as shown in FIG. 14(a), so that the piston 44 urges the plate spring 42 to the right-hand side in the drawing. At this time, the valve 41 attached to the plate spring 42 extends through a hole 45 in the outer diameter portion of the plate 37 and contact with the front surface of the drive disk 36 in the first chamber 39. The hole 45 includes, as shown in FIG. 15, an insertion hole 45a and a connective hole 45b continuously formed therewith. The valve 41 is inserted into the insertion hole 45a. Since there exists always a relative velocity as between the drive disk 36 and the side of the casing 35 or the valve 41, the oil (indicated by numerous dots) between the drive disk 36 and the plate 37 is scraped out therefrom into the second chamber 40 through the connective hole 45b, by means of the valve 41 serving as a weir. In this condition, most oil in the first chamber 39 is flown into the second chamber 40, so that only a small quantity of oil is remained in the first chamber 39. Thus, the transmitting torque is reduced, so that the rotational speed of the fan 30 becomes low. It is noted that the arrow mark in FIG. 15 indicates the direction of rotation of the drive disk 36.

When the outside air temperature is high, the bimetal 43 is bent as shown in FIG. 14(b). Thus, the valve 41 is displaced in the left-hand side in the drawing, whereby the piston 44 is disengaged from the hole 45 by reason of the elasticity of the plate spring 42. Thus, the above-mentioned scraping-out effect is disabled, so that the oil in the first and second chambers 39, 40 respectively are communicated with each other through the hole 45, so as to form the same level. At this time, the oil is filled to the effective transmission surface of the first chamber 39, so that a predetermined amount of torque may be transmitted, so as to increase the rotational speed of the fan 30.

When the above-mentioned fan 30 incorporates a ball bearing having a construction the same as that of the above-mentioned ball bearing for the pulley, occurrence of abnormal noise under cold ambient may be reliably prevented.

Now, a belt transmitting device according to the invention will be explained with reference to FIGS. 10 and 11.

Figure 10:
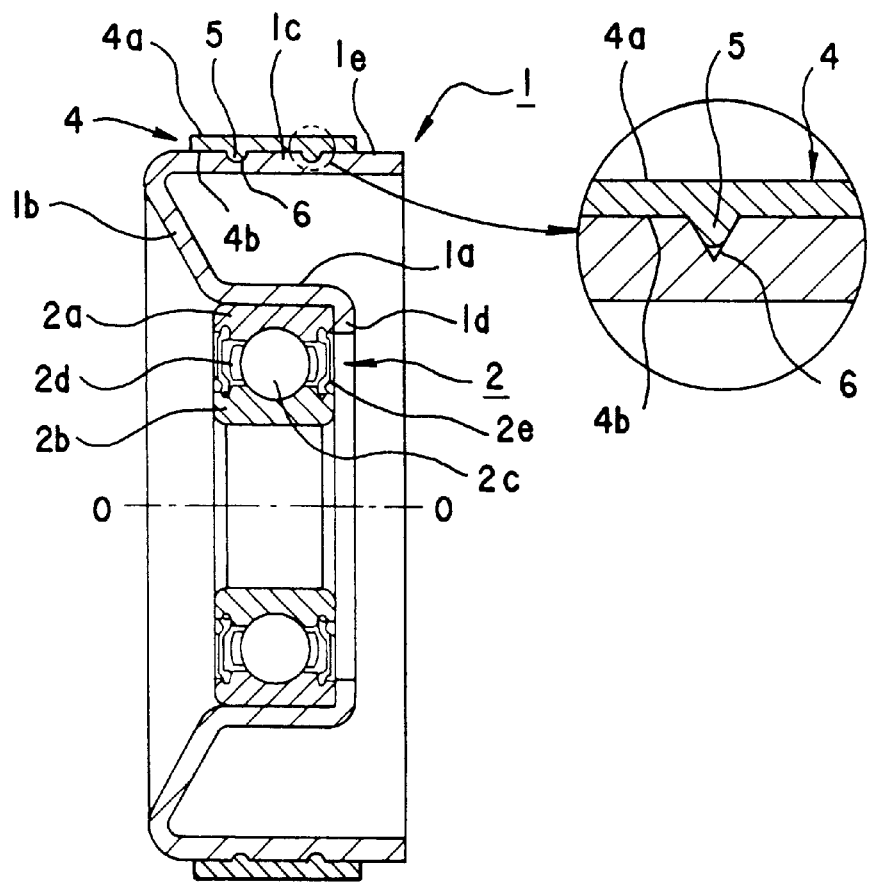
FIG. 10 is an enlarged view, in section, of a main part of an idler pulley to be used in a belt transmission according to the invention.

The pulley shown in FIG. 10 is an idler pulley for use in an accessary drive belt of an automobile. The pulley includes a pulley body 1 pressed from a steel plate, and a deep groove ball bearing of a single row type fitted within the inner diameter of the pulley body 1. The pulley body 1 is constructed by an annular body which includes an inner cylindrical portion 1a, a flange portion 1b extending radially outwardly from one end of the inner cylindrical portion 1a, an outer cylindrical portion 1c, extending axially from the flange portion 1b, and a collar 1d extending radially inwardly from the other end of the inner cylindrical portion 1a. An outer ring 2a of the ball bearing 2 is fitted within the inner diameter of the inner cylindrical portion 1a. A peripheral surface 1e for contact with a back side surface 4b of the belt 4 is provided in the outer diameter of the outer cylindrical portion 1c. The peripherally surface 1e is contacted with the belt 4, so that the pulley serves as an idler.

The ball bearing 2 includes an outer ring 2a fitted within the inner diameter of the inner cylindrical portion 1a of the pulley body 1, an inner ring 2b fitted over a stationary shaft (not shown), a plurality of balls disposed in a space between the raceway surface 3b of the inner ring 2b and the raceway surface 3a of the outer ring 2a, a retainer 2d for equidistantly retaining the balls 2c in the circumferential direction, and a pair of seals 2e for sealing a quantity of grease. The outer ring 2a and the inner ring 2b are separately formed in an integral form.

The belt 4 includes a drive surface 4a and the back side surface 4b. The back side surface 4b of the belt 4 is formed with a pair of engagement portions 5 spaced along the width of the belt 4. Each of the engagement portions 5 is a protrusion having a cross-section of a substantially V-shaped configuration. The engagement portions 5 are arranged in parallel with each other and extend entirely along the periphery of the back side surface 4b of the belt 4. The peripheral surface 1e of the pulley body 1 is also provided with a pair of engaged portions 6 which are also spaced from one another along the width of the belt 4. Each of the engaged portion 6 is formed into a configuration of recessed groove so as to be engageable with a respective engagement portion 5.

A V-belt is known in the art as a belt having a protrusion. It is noted, however, that, in such a known V-belt, the protrusion is provided in the drive surface 4a to be engaged with a drive pulley or a driven pulley. Thus, it is different in construction from the above-mentioned belt 4 in which the protrusion is provided in the backside surface 4b. Accordingly, known V-belt is not used in the above-mentioned transmitting device.

The back side surface 4b of the belt 4 and the peripheral surface 1e of the pulley are engaged with each other through the recesses and protrusions provided at two positions spaced along the width of the belt 4. Thus, the belt 4 restricts the outer ring 2a in the axial direction, so as to restrict occurrence of vibration of the outer ring in the axial direction. By this, occurrence of abnormal noise under cold ambient may be restricted.

Figure 11:
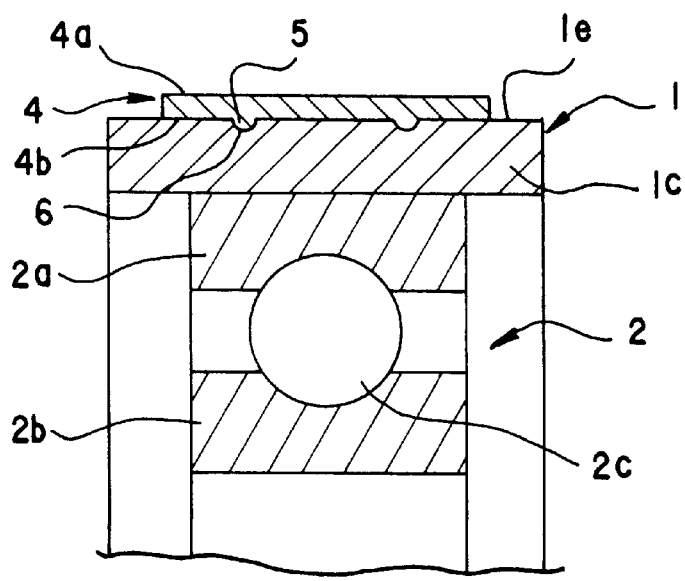
FIG. 11 is a cross-sectional view showing an idler pulley having a pulley body of a different configuration.
Figure 12:
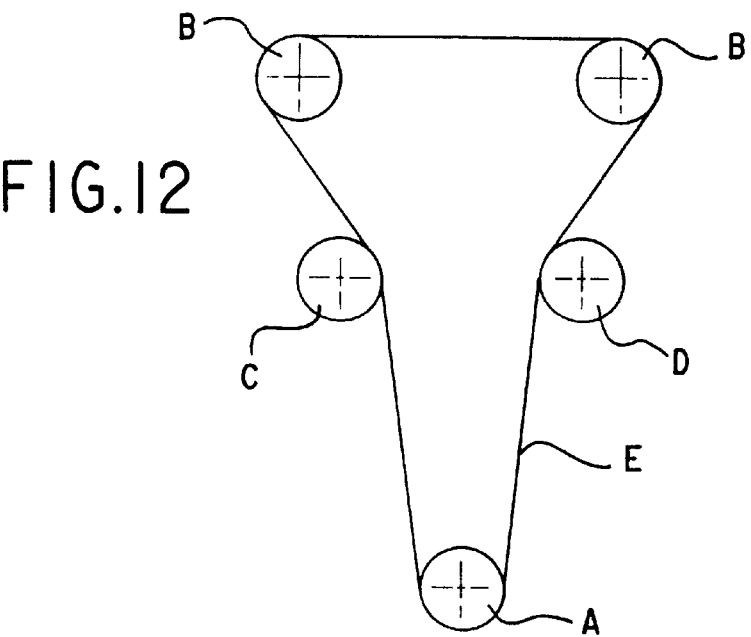
FIG. 12 is a front elevational view showing one constructional example of a timing belt for an automobile.
Figure 13:
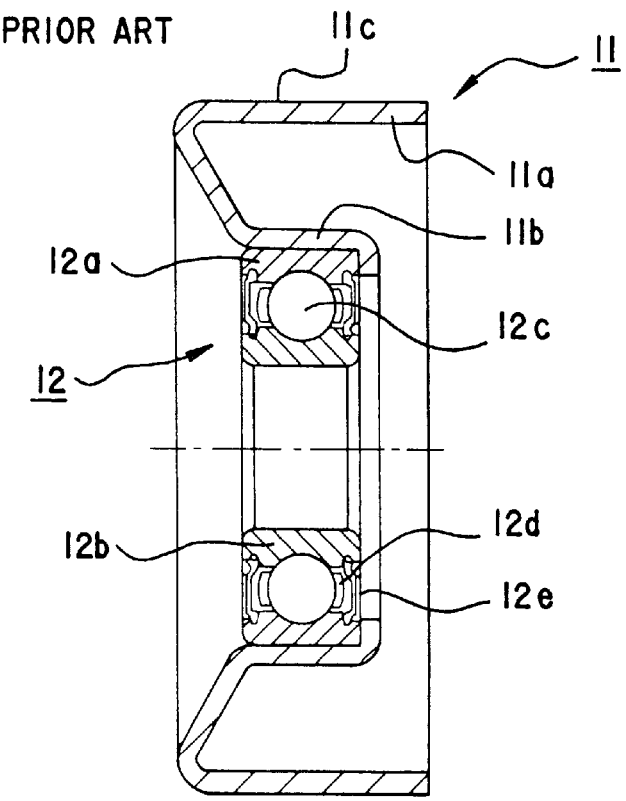
FIG. 13 is a cross-sectional view showing a pulley according to prior art.

FIG. 11 shows a pulley body 1 formed from a thick-walled cylinder. The pulley body 1 is fitted over an outer ring 2a of a bearing 2. In this case, it is also possible to obtain the advantages the same as those obtained in the pulley shown in FIG. 10. Similar advantages may be also obtained, when the pulley body 1 and the outer ring 2a are integrally formed.

Figure 16:
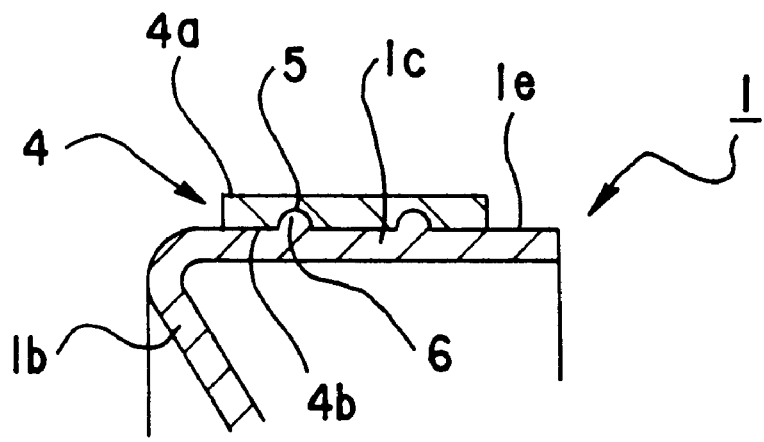
FIGS. 16–17 are cross-sectional views showing an idler pulley having a pulley body and belt of different configurations.
Figure 17:
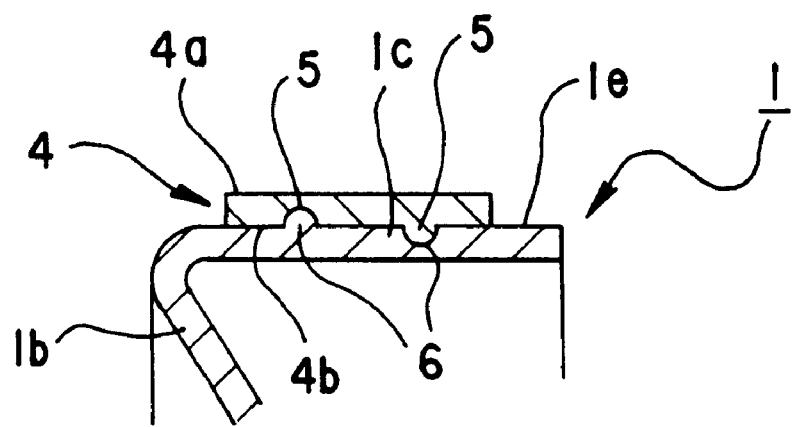

The above-mentioned advantages may be obtained not only from the construction in which, as shown in FIGS. 10 and 11, the engagement portion 5 in the backside surface 4b of the belt is a protrusion, and the engaged portion 6 in the peripheral surface 1e of the pulley is a recessed groove, but also from the construction in which, on the contrary to the above, a recessed groove is provided in the backside surface 4b of the belt and a protrusion is provided in the peripheral surface 1e of the pulley (FIG. 16). It is also possible to provide a protrusion and a recessed groove, arranged in parallel with each other, in the backside surface 4b of the belt and to provide a recessed groove and a protrusion to be engaged with the above protrusion and recessed groove, respectively, in the peripheral surface 1e of the pulley (FIG. 17).

The number of the engagement portion(s) 5 and the engaged portion(s) is desirably selected. One or more rows of engagement/engaged portions may be provided. It is noted, however, that the outer ring 2a is not sufficiently restricted in the axial direction when a single row of engagement/engaged portion is provided. Thus, it is desirable to provide two or more rows of engagement/engaged portions, so as to effectively restrict occurrence of abnormal noise.

The invention is not limited, in its application, to the above-mentioned timing belt of an automobile. The invention is applicable to any belt tranmitting device in which one or more idler pulleys C, D are disposed between a drive pulley (A in FIG. 10) and one or more driven pulleys (B).

What is claimed is:

1. A belt transmitting device for an automobile comprising a belt extending between a drive pulley and a driven pulley, the belt having a drive surface and a backside surface, the drive surface being in contact with the drive pulley and the driven pulley, and an idler pulley disposed between the drive pulley and the driven pulley, the idler pulley including a pulley body having a peripheral surface in contact with the belt, the pulley body being fitted on an outer diameter of an outer ring of a ball bearing, the idler pulley being adapted to be in contact with the backside surface of the belt, wherein:

said idler pulley and said backside surface of said belt are contacted with each other through at least one of two or more protrusion portions and recess portions spaced along the width of said belt wherein said at least one of said protrusion portions and said recess portions engage a corresponding at least one of recesses and protrusions, respectively, disposed in said idler pulley to restrict occurrence of vibrations of the outer ring in an axial direction.

2. A belt transmitting device according to claim 1, wherein said idler pulley is constructed by integrally forming said pulley body and said outer ring of said ball bearing, wherein said pulley body and outer ring of said ball bearing are of one piece.

3. A belt for use in a belt transmitting device for an automobile which includes an idler pulley disposed between a drive pulley and a driven pulley, the idler pulley including a pulley body having a peripheral surface, the pulley body being fitted on the outer diameter of an outer ring of a ball bearing, the belt comprising a drive surface and a backside surface, the drive surface being in contact with the drive pulley and the driven pulley, the belt being extended between the drive pulley and the driven pulley with the backside surface being in contact with the idler pulley, wherein plural rows of annular engagement portions are spaced along a width of the belt and comprise of at least one of recessed grooves and protrusions provided in the backside surface to engage plural rows of corresponding annular engaged portions disposed in said idler pulley comprising of at least one of said protrusions and said grooves, respectively, to restrict occurrence of vibrations of the outer ring in an axial direction.

4. A belt according to claim 3, wherein the idler pulley is constructed by integrally forming the pulley body and the outer ring of the bail bearing, wherein said pulley body and outer ring are of one piece.

5. An idler pulley for use in a belt transmitting device for an automobile which includes a belt being extended between a drive pulley and a driven pulley, the belt having a drive surface and a back side surface, the drive surface being in contact with the drive pulley and the driven pulley, the idler pulley including a pulley body having a peripheral surface to be in contact with the belt, the pulley body being fitted on the outer diameter of an outer ring of a ball bearing, the idler pulley being in contact with the back side surface of the belt and disposed between the drive pulley and the driven pulley, wherein:

plural rows of annular engaged portions are provided in the peripheral surface of the pulley, the engaged portions being comprising at least one of a recessed groove and a protrusion, wherein said engaged portions in said peripheral surface of said pulley engage corresponding engagement portions comprising at least one of said protrusion and said recessed groove, respectively, spaced along a width of said back side of said belt to restrict occurrence of vibrations of the outer ring in an axial direction.

6. An idler pulley according to claim 5, wherein the pulley body and the outer ring of the ball bearing are integrally formed of one piece.

* * * * *